United States Patent
Gadkaree et al.

(10) Patent No.: US 9,136,064 B2
(45) Date of Patent: Sep. 15, 2015

(54) CARBON FOR HIGH VOLTAGE EDLCS

(71) Applicant: Corning Incorporated, Corning, NY (US)

(72) Inventors: Kishor Purushottam Gadkaree, Painted Post, NY (US); Andrew Fleitz Husted, Wellsburg, NY (US); Xiaorong Liu, Oneonta, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/166,427

(22) Filed: Jan. 28, 2014

(65) Prior Publication Data

US 2015/0030526 A1    Jan. 29, 2015

Related U.S. Application Data

(60) Provisional application No. 61/858,902, filed on Jul. 26, 2013, provisional application No. 61/894,990, filed on Oct. 24, 2013.

(51) Int. Cl.
*C01B 31/10* (2006.01)
*H01G 11/34* (2013.01)

(52) U.S. Cl.
CPC ............ *H01G 11/34* (2013.01); *C01B 31/10* (2013.01); *C01P 2006/14* (2013.01); *C01P 2006/16* (2013.01)

(58) Field of Classification Search
CPC .......... H01M 4/583; B01J 20/00; B01J 20/28; B01J 20/28007; B01J 20/2805; B01J 20/28016; B01J 20/28069; B01J 20/28071; B01J 20/28073; B01J 20/28078; B01J 20/2808; B01J 20/28083; B01J 20/20
USPC ................................ 429/231.8; 502/416, 417
See application file for complete search history.

(56) References Cited

U.S. PATENT DOCUMENTS

| | | | | |
|---|---|---|---|---|
| 6,827,879 | B2 * | 12/2004 | Shinozaki et al. | 252/502 |
| 7,625,839 | B2 * | 12/2009 | Hirahara et al. | 502/432 |
| 7,976,587 | B2 * | 7/2011 | Gadkaree et al. | 29/25.03 |
| 2008/0180881 | A1 * | 7/2008 | Feaver et al. | 361/502 |
| 2011/0271855 | A1 | 11/2011 | Eilertsen | 101/141 |

OTHER PUBLICATIONS

Aida, Taira, Koji Yamada, and Masayuki Morita. "An advanced hybrid electrochemical capacitor that uses a wide potential range at the positive electrode." Electrochemical and solid-state letters 9.12 (2006): A534-A536.*
"Phenolic Resins" <http://wpage.unina.it/avitabil/testi/PheForm.pdf> Available Feb. 12, 2009. Accessed May 15, 2014.*

(Continued)

*Primary Examiner* — Richard M Rump
(74) *Attorney, Agent, or Firm* — John L. Haack; Michael W. Russell (57) ABSTRACT

A method for producing activated carbon includes heating a phenolic novolac resin carbon precursor at a carbonization temperature effective to form a carbon material, and reacting the carbon material with $CO_2$ at an activation temperature effective to form the activated carbon. The resulting activated carbon can be incorporated into a carbon-based electrode of an EDLC. Such EDLC can exhibit a potential window and thus an attendant operating voltage of greater than 3V.

20 Claims, 5 Drawing Sheets

(56) References Cited

OTHER PUBLICATIONS

Hahn, M., et al. "A dilatometric study of the voltage limitation of carbonaceous electrodes in aprotic EDLC type electrolytes by charge-induced strain." Carbon 44.12 (2006): 2523-2533.*

J.M. Nelson, et al., "The Electromotive Force Developed in Cells Containing Nonaqueous Liquids", *Organic Laboratory*, Columbia University and the Harriman Research Laboratory, Oct. 25, 1916, pp. 82-83.

Babel et al; "Electrical Capacitance of Fibrous Carbon Composites in Supercapacitors"; Fuel Processing Technology 77-78 (2002) 181-189.

Liu et al; "Capacitance Limites of Activated Carbon Fiber Electrodes in Aqueous Electrolyte" Journal of the Electrochemical Society; 155 (1) F1-F7 (2008).

Liu et al; "Some Effects of Textural Properties of Carbon Fibers From Phenolic Resins on Double-Layer Capacitance in Aprotic Electrolyte"; Journal of the Electrochemical Society, 155 (6) F124-F131 (2008).

Pajak et al; "Activated Carbons From Crosslinked Novolac Resin"; Adsorption Science & Technology, Blackwell Scientific, Oxford, GB, vol. 23, No. 5, Jun. 1, 2005 pp. 381-386.

PCT/US2014/047712 Search Report.

* cited by examiner

CARBON FOR HIGH VOLTAGE EDLCS

CROSS-REFERENCE TO RELATED APPLICATIONS

This application claims the benefit of priority under 35 U.S.C. §119 of U.S. Application Ser. No. 61/894,990 filed on Oct. 24, 2013, and U.S. Application Ser. No. 61/858,902 filed on Jul. 26, 2013, the entire contents of which are hereby incorporated by reference.

BACKGROUND

1. Field

The present disclosure relates generally to methods for forming activated carbon, and more specifically to physical activation of resin-based carbon using carbon dioxide.

2. Technical Background

Energy storage devices such as ultracapacitors may be used in a variety of applications such as where a discrete power pulse is required. Example applications range from cell phones to hybrid vehicles. Ultracapacitors also known as electrochemical double layer capacitors (EDLCs) have emerged as an alternative or compliment to batteries in applications that require high power, long shelf life, and/or long cycle life. Ultracapacitors typically comprise a porous separator and an organic electrolyte sandwiched between a pair of carbon-based electrodes. The energy storage is achieved by separating and storing electrical charge in the electrochemical double layers that are created at the interfaces between the electrodes and the electrolyte. Important characteristics of these devices are the energy density and power density that they can provide, which are both largely determined by the properties of the carbon that is incorporated into the electrodes.

Carbon-based electrodes suitable for incorporation into energy storage devices are known. Activated carbon is widely used as a porous material in ultracapacitors due to its large surface area, electronic conductivity, ionic capacitance, chemical stability, and/or low cost. Activated carbon can be made from synthetic precursor materials or natural precursor materials, such as coals, coconut shells, and biomass. With both synthetic and natural precursors, the activated carbon can be formed by first carbonizing the precursor and then activating the intermediate product. The activation can comprise physical (e.g., steam) or chemical activation at elevated temperatures to increase the porosity and hence the surface area of the carbon.

Both physical and chemical activation processes typically involve large thermal budgets to heat and react the carbonized material with the activating agent. In the case of chemical activation, corrosive by-products can be formed when a carbonized material is heated and reacted with an activating agent such as KOH. Additionally, phase changes that may occur during the heating and reacting of the carbonized material and chemical activating agent can result in undesired agglomeration of the mixture during processing. These drawbacks can add complexity and cost to the overall process, particularly for reactions that are carried out at elevated temperatures for extended periods of time.

Significant issues have been reported when caustic materials, such as KOH, are used for the chemical activation of carbon. For example, when rotary kilns are used in carbon activation, it is often required that the feedstock undergoes calcination and/or drying and/or dehydration prior to treatment at activation temperatures. Agglomeration tends to pose significant issues, such as increased process complexity and/or cost, in continuous processes, for instance, processes employing screw kneaders. As a means to avoid agglomeration issues, other technologies such as roller hearths, have been employed wherein trays are loaded with activation mix material and passed through a multiple zone tunnel furnace. Such furnaces may be costly in operation and may have limited throughput since only one tray level is passed through the furnace at a time. The furnace width is also limiting factor for roller hearths on throughput since roller length spanning across the furnace is limited by material availability and strength at service temperature.

Accordingly, it would be advantageous to provide activated carbon materials and processes for forming activated carbon materials using a more economical activation route while also minimizing the technical issues of corrosion and/or agglomeration. The resulting activated carbon materials can possess a high surface area to volume ratio and minimal reactivity, particularly with the organic electrolyte at elevated voltages, and can be used to form carbon-based electrodes that enable efficient, long-life and high energy density devices.

BRIEF SUMMARY

In accordance with embodiments of the present disclosure, activated carbon that is suitable for incorporation into carbon-based electrodes for use in ultracapacitors and other high power density energy storage devices is derived via carbon dioxide activation from a phenolic novolac resin carbon precursor material. Compared to chemical activation routes, the $CO_2$-activated carbon described in the present disclosure may provide as much as a 50% reduction in cost.

Activated carbon can be prepared by heating a phenolic novolac resin carbon precursor at a carbonization temperature effective to form a carbon material, and then reacting the carbon material with carbon dioxide at an activation temperature effective to form activated carbon. In various embodiments, the resin precursor can be cured prior to carbonization.

Additional features and advantages of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Reference will now be made in greater detail to various embodiments of the subject matter of the present disclosure, some embodiments of which are illustrated in the accompanying drawings. The same reference numerals will be used throughout the drawings to refer to the same or similar parts.

In order to realize higher energy densities and higher power densities, next generation EDLCs will likely operate at high applied voltages. It may be desirable, therefore, to minimize unwanted Faradaic reactions between the activated carbon and the liquid electrolyte, particularly at the higher applied voltages.

A method for producing activated carbon comprises heating a phenolic novolac resin carbon precursor at a carbonization temperature effective to form a carbon material, and reacting the carbon material with $CO_2$ at an activation temperature effective to form the activated carbon.

The activated carbon formed according to the disclosed methods is suitable to form carbon-based electrodes for use in high energy density devices. Advantageously, ultracapacitors made using the inventive carbon-based electrodes may exhibit energy densities that are higher than the energy densities of ultracapacitors made using electrodes derived from commercially-available activated carbon.

Figure 1:
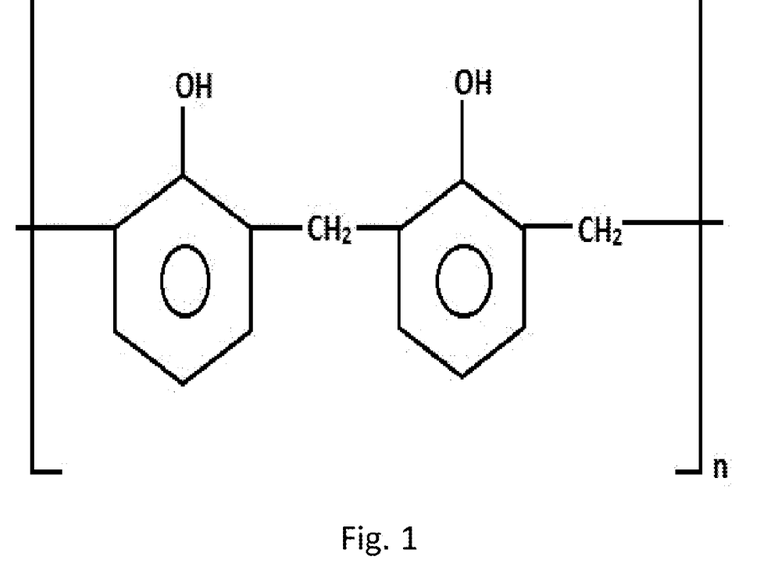
FIG. 1 is a schematic illustrating the chemistry of a novolac resin.

The carbon precursor is a novolac resin. Novolacs are phenol-formaldehyde resins with a formaldehyde-to-phenol molar ratio of less than one (F:P<1). During their synthesis, polymerization is typically brought to completion via acid-catalysis using, for example, oxalic acid, hydrochloric acid or sulfonate acid. The phenol units are linked mainly by methylene and/or ether groups. The chemical structure of novolac resin is illustrated in FIG. 1. By contrast, resole resins are alkaline catalyzed and are typically made with a formaldehyde-to-phenol molar ratio of greater than one (F:P>1).

An acidic catalyst and a molar excess of phenol to formaldehyde can be used to make novolac resins. The following schematic illustrates various different products that are possible. The initial reaction is between methylene glycol and phenol, according to:

The reaction continues with additional phenols, and the splitting off of water:

The reaction creates a methylene bridge at either the ortho position or the para position of the phenolic aromatic rings. The para position is approximately twice as reactive as the ortho position, but there are twice as many ortho sites (two per phenol molecule) so the fractions of ortho-ortho, para-para and ortho-para bridges are approximately equal.

Branching may occur because the reaction can proceed at any of three sites on each ring. As the reaction continues, the random orientations and branching quickly result in a complex mixture of polymers of different sizes and structures. The reaction stops when the formaldehyde reactant is exhausted, often leaving up to 10% of un-reacted phenol. Distillation of the molten resin during manufacturing removes the excess phenol and water.

The phenol-formaldehyde starting material may be made from a variety of phenols (e.g., phenol, cresol, xylenols, etc. including their various isomers) and aldehydes (e.g., formaldehyde, acetaldehyde, glyoxal, furfural, etc.).

The final novolac resin is unable to react further without the addition of a crosslinking agent. Novolac resins are commercially available with and without a curing agent. Resins including the curing agent cure or "thermoset" to the desired degree when processed. An example curing agent is hexamethylene tetraamine.

Novolac resins are amorphous (not crystalline) thermoplastics. As they are most typically used, they are solid at room temperature and will soften and flow between 65° C. and 105° C. The number average molecular weight (Mn) of a standard phenol novolac resin is between 250 and 900. With the molecular weight of phenol being 94 grams/mole, a Mn of 500 compounds to a resin where the average polymer size in the entire distribution of polymers is five linked phenol rings. Novolac resins are soluble in many polar organic solvents (e.g., alcohols, acetone), but not in water.

Optionally, prior to carbonization, the novolac resin can be cured (i.e., cross-linked). Curing can be carried out by heating the novolac resin at a temperature ranging from about 65-200° C., e.g., 125-175° C. such as about 150° C. The curing can be performed in a step separate from the carbonization step, i.e., by heating the material at a curing temperature and then cooling the material to form a cured resin. Alternatively, the curing can be formed in a step integral with the carbonization step, i.e., by heating the material at a curing temperature, and then continuing to heat the cured resin to a carbonization temperature.

In an example, novolac resin was cured by providing a mixture of the resin and hexamethylene tetraamine by heating the mixture in a box furnace in air according to the following schedule: ramp temperature from 25° C. to 50° C. at 0.8° C./min, hold for 3 hrs, ramp to 80° C. at 0.5° C./min, hold for 3 hrs., ramp to 95° C. at 0.5° C./min, hold for 3 hrs., ramp to 110° C. at 0.8° C./min, hold for 2 hrs, ramp to 125° C. at 0.8° C./min, hold for 90 min., ramp to 150° C. at 0.8° C./min, hold for 30 min, and then cool the furnace to 25° C.

During curing, the hexamine dissolves in the novolac and decomposes by hydrolysis in the molten resin, evolving ammonia and forming α-amino-alcohols and formaldehyde. The cured resin contain up to approximately 6% nitrogen in the form of amine bridges.

The cured or uncured carbon precursor can be carbonized in an inert or reducing atmosphere. As an example, a carbon precursor can be heated at a temperature from about 600° C. to 800° C. (e.g., 600, 650, 700, 750 or 800° C.) for a predetermined time (e.g., 0.5, 1, 2, 4, 8 or more hours) and then optionally cooled. Carbonization is the term for the conversion of the precursor material into carbon or a carbon-containing residue through pyrolysis or destructive distillation. During carbonization, the carbon precursor decomposes and forms carbon material.

Prior to activation, the carbon material can be milled to decrease its particle size. For example, the carbon material can be milled to have an average particle size of less than 200 microns (e.g., from 1 to 10 microns) prior to activation.

The carbon material formed via carbonization can, in turn, be activated by exposure to carbon dioxide. As used herein, activation refers to the process of heating carbonized or pyrolyzed material at an activation temperature during exposure to a $CO_2$-containing atmosphere to produce activated carbon. The activation process generally removes a given volume of material from the material being treated, resulting in an increased surface area.

In embodiments, the $CO_2$ activation process can be performed under a controlled atmosphere using a rotary kiln or other suitable furnace. During activation, the carbon material is simultaneously exposed to $CO_2$ gas at elevated temperature.

Figure 2:
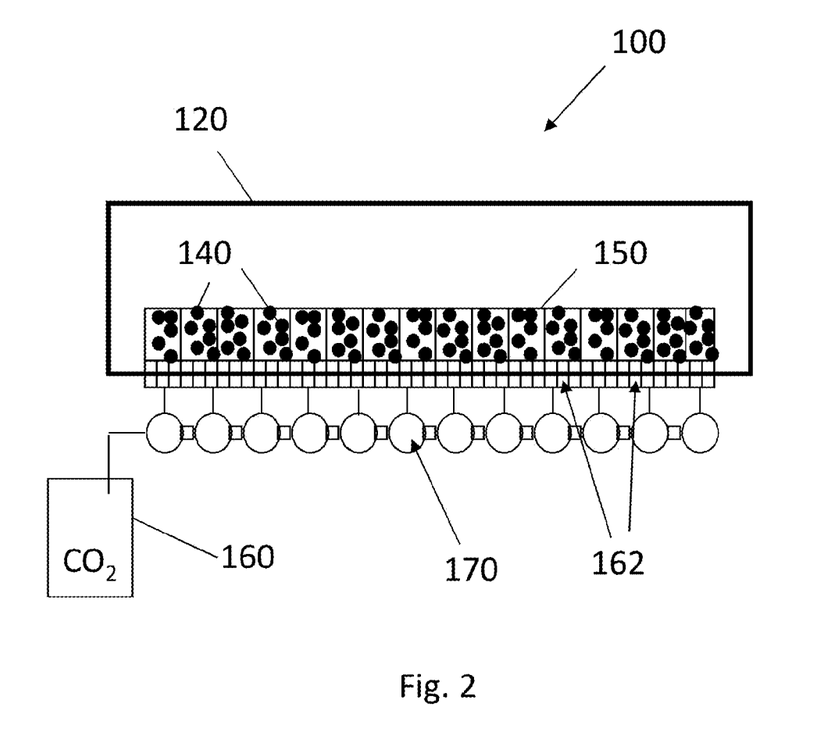
FIG. 2 is a schematic of an example apparatus for forming $CO_2$-activated carbon.

The foregoing is illustrated schematically in FIG. 2, which shows an example apparatus 100 for forming $CO_2$-activated carbon. Apparatus 100 includes a furnace 120 and a $CO_2$ source 160 adapted to provide a flow of $CO_2$ via manifold 170 into the furnace. Located within the furnace is a vessel 150 for holding the carbon material. In operation, $CO_2$ is introduced from source 160 via manifold 170 into the furnace where it flows over and reacts with the carbon material 140 to form activated carbon.

In an example process, a $CO_2$ flow rate of about 40 liters/minute can be used to deliver $CO_2$ to the furnace where carbon material is incorporated into reaction vessel 150 via baffles 162 can be used to support the carbon material while permitting passage of the $CO_2$. After reacting the carbon material with $CO_2$ within the furnace 120 at about 975° C. for 2.5 hrs, the furnace can be cooled and the activated carbon optionally processed further.

In various embodiments, the activation temperature can range from about 900° C. to 1100° C. For example the activation temperature can range from about 950° C. to 1050° C., e.g., about 950° C., 975° C. or 1000° C. The $CO_2$ flow rate during activation can range from about 1 liters/min to about 100 liters/min, e.g., 1, 10, 15, 20, 50 or 100 liters/min. The activation time can range from several minutes to several hours (e.g., 30, 60, 90, 120, 150, 180, 210 or 240 minutes).

The resulting activated carbon can be washed, e.g., with an acidic solution. The washing can reduce the ash content and remove unwanted impurities from the activated carbon. One process for washing the activated carbon involves sequentially rinsing the activated carbon with water and acid. A further washing process involves rinsing the activated carbon with an aqueous acid mixture (e.g., mixture of acid and water). Acids used during the washing can include hydrochloric acid and sulfuric acid.

In further embodiments, in addition to or in lieu of washing, the activated carbon can be heated treated in an inert or reducing atmosphere. The optional heat treatment can eliminate or lessen the concentration of oxygen in the activated carbon. For example, such a heat treatment can remove oxygen-containing functional groups from the activated carbon surface. In embodiments, the activated carbon can be treated with both a washing step and a heat treatment, and where both processes are performed, the washing step may be performed either before or after the heat treatment.

One method to reduce oxygen content is to refine (heat) the activated carbon material in an inert environment (such as nitrogen, helium, argon, etc.) or in a reducing environment (such as hydrogen, forming gas, carbon monoxide, etc.).

Activated carbon refining can be performed in a retort furnace (CM Furnaces, Model 1212FL) purged with nitrogen. The furnace temperature can be increased at a rate of 200° C./hr. to the desired refining heat treatment temperature (e.g., 500-800° C.), held constant for 2 hours, and then cooled down to room temperature before exposure to ambient atmosphere.

The minimization of impurities and adsorbed surface groups in the activated carbon via washing and/or heat treatment can decrease the occurrence of unwanted reactions between such species and electrolyte ions during cell operation, particularly at elevated voltages. In some embodiments, the activated carbon includes a total oxygen content of less than 10 wt. %. In additional embodiments, the total oxygen content is less than 9, 8, 7, 6, 5, 4, 3, 2 or 1 wt. %.

The activated carbon can comprise micro-, meso- and/or macroscale porosity. As defined herein, microscale pores have a pore size of 2 nm or less, and ultramicropores have a pore size of 1 nm or less. Mesoscale pores have a pore size ranging from 2 to 50 nm. Macroscale pores have a pore size greater than 50 nm. In an embodiment, the activated carbon comprises a majority of microscale pores. As used herein, the term "microporous carbon" and variants thereof means an activated carbon having a majority (i.e., at least 50%) of microscale pores. A microporous, activated carbon material can comprise greater than 50% microporosity (e.g., greater than 50, 55, 60, 65, 70, 75, 80, 85, 90 or 95% microporosity).

According to embodiments, a carbon-based electrode for an EDLC comprises activated carbon having a total porosity greater than about 0.2 $cm^3/g$ (e.g., greater than 0.2, 0.25, 0.3, 0.35, 0.4, 0.45, 0.5, 0.55, 0.6, 0.65, 0.7, 0.75, 0.8, 0.85 or 0.9 $cm^3/g$). In related embodiments, the activation carbon can have a total porosity less than 1 $cm^3/g$ (e.g., less than 1, 0.9, 0.85, 0.8, 0.75, 0.7, 0.65, 0.6, or 0.55 $cm^3/g$). In still further embodiments, the total porosity of the activated carbon can be between any of the foregoing values.

The pore size distribution of the activated carbon can include ultramicropores, micropores, mesopores and macropores and may be characterized as having a unimodal, bimodal or multi-modal pore size distribution. The ultramicropores can comprise 0.2 $cm^3/g$ or more (e.g., 0.2, 0.25, 0.3, 0.35 or 0.4 $cm^3/g$ or more) of the total pore volume and, in related embodiments, populations between any of the foregoing values, e.g., from 0.25 to 0.3 $cm^3/g$ or from 0.25 to 0.35 $cm^3/g$. Pores having a pore size (d) in the range of $1<d\leq2$ nm can comprise 0.05 $cm^3/g$ or more (e.g., at least 0.05, 0.1, 0.15, 0.2, 0.25, 0.3, 0.35, 0.4, 0.45 or 0.5 $cm^3/g$) of the total pore volume. Pores having a pore size (d) in the range of $1<d\leq2$ nm can comprise 0.55 $cm^3/g$ or less (e.g., less than 0.55, 0.5, 0.45, 0.4 or 0.35 $cm^3/g$) of the total pore volume. In complimentary embodiments, the activated carbon can include pores having a pore size (d) in the range of $1<d\leq2$ nm between any of the foregoing values, e.g., from 0.1 to 0.25 $cm^3/g$ or from 0.3 to 0.5 $cm^3/g$. If present, in an embodiment, any pores having a pore size greater than 2 nm, which may include mesopores and/or macropores, can comprise 0.25 $cm^3/g$ or less (e.g., less than 0.25, 0.2, 0.15, 0.1 or 0.05 $cm^3/g$) of the total pore volume. In complimentary embodiments, the activated carbon can include pores having a pore size d>2 nm between any of the foregoing values, i.e., from 0.2 to 0.25 $cm^3/g$ or from 0.1 to 0.2 $cm^3/g$. For the sake of clarity, activated carbon pore sizes may be any rational number within the recited range. Thus, pores having a size from >1 nm to ≤2 nm may include 1.01, 1.115, 1.6, 1.99 and 2.0 nm.

Example pore size distributions for activated carbon for one or both electrodes are illustrated in Table 1.

TABLE 1

Example pore size distributions

| Pore size | Example 1 | Example 2 | Example 3 | Example 4 |
|---|---|---|---|---|
| d < 1 nm | ≥0.2 $cm^3/g$ | 0.2-0.4 | 0.25-0.35 | 0.275-0.325 |
| 1 < d ≤ 2 nm | ≥0.05 $cm^3/g$ | 0.15-0.5 | 0.15-0.25 | 0.175-0.225 |
| d > 2 nm | <0.25 $cm^3/g$ | <0.25 | ≤0.1 | ≤0.03 |

The activated carbon made using the disclosed method can have a specific surface area greater than about 300 $m^2/g$, i.e., greater than 350, 400, 500 or 1000 $m^2/g$. In embodiments, the average particle size of the activated carbon can be milled to less than 20 microns prior to incorporating the activated carbon into a carbon-based electrode.

A method for producing a carbon-based electrode comprises heating a phenolic novolac resin carbon precursor at a carbonization temperature effective to form a carbon material, reacting the carbon material with carbon dioxide at an activation temperature effective to form an activated carbon material, and forming a carbon-based electrode from the resulting activated carbon. Prior to forming a carbon-based electrode, the activated carbon material may be dried and optionally ground to form a powder, which can then be incorporated into the electrode-making process.

In a typical electrochemical double layer capacitor (EDLC), a pair of carbon-based electrodes is separated by a porous separator and the electrode/separator/electrode stack is infiltrated with a liquid organic or inorganic electrolyte. The electrodes comprise activated carbon that has been mixed with other additives (e.g., binders) and compacted into a thin sheet and laminated to a conductive metal current collector backing.

Optionally, in conjunction with the foregoing methods, the activated carbon can be mixed with carbon black and/or a polymeric binder such as polytetrafluroethylene (PTFE) or other suitable binder and compacted to form the carbon-based electrodes.

By way of example, a carbon paper having a thickness in the range of about 100-300 micrometers can be prepared by rolling and pressing a powder mixture comprising 60-90 wt. % activated carbon, 5-20 wt. % carbon black and 5-20 wt. % PTFE. The carbon-based electrodes can be rolled into jelly roll using a cellulosic separator, and then placed into an aluminum can.

The present disclosure also relates to an electrochemical device, such as an electrochemical double layer capacitor (EDLC), comprising at least one carbon-based electrode that includes the activated carbon material described herein.

Ultracapacitors typically comprise two porous electrodes that are isolated from electrical contact with each other by a porous dielectric separator. The separator and the electrodes are impregnated with an electrolytic solution that allows ionic current to flow between the electrodes while preventing electronic current from discharging the cell. Each porous electrode is typically in electrical contact with a current collector. The current collector, which can comprise a sheet or plate of electrically-conductive material (e.g., aluminum) can reduce ohmic losses while providing physical support for the porous electrode (activated carbon) material.

According to a further embodiment, an electrochemical cell comprises at least a first electrode comprising an activated carbon material as disclosed herein, a porous separator, and a pair of electrically conductive substrates, wherein the porous separator is disposed between the first electrode and a second electrode, and the first and second electrodes are each in electrical contact with a respective electrically conductive substrate.

Figure 3:
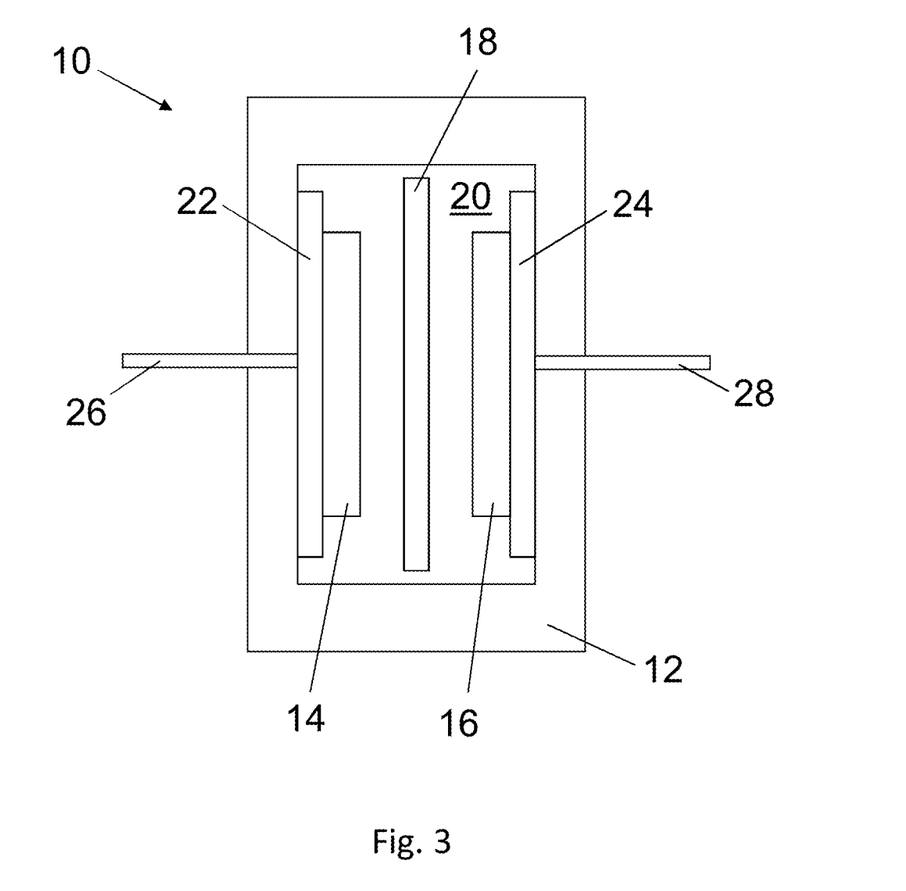
FIG. 3 is a schematic illustration of an example ultracapacitor.

FIG. 3 is a schematic illustration of an example ultracapacitor. Ultracapacitor 10 includes an enclosing body 12, a pair of current collectors 22, 24, a positive electrode 14 and a negative electrode 16 each respectively formed over one of the current collectors, and a porous separator layer 18. Electrical leads 26, 28 can be connected to respective current collectors 22, 24 to provide electrical contact to an external device. Electrodes 14, 16 comprise porous activated carbon layers that are formed over the current collectors. A liquid electrolyte 20 is contained within the enclosing body and incorporated throughout the porosity of both the porous separator layer and each of the porous electrodes. In embodiments, individual ultracapacitor cells can be stacked (e.g., in series) to increase the overall operating voltage.

The enclosing body 12 can be any known enclosure means commonly-used with ultracapacitors. The current collectors 22, 24 generally comprise an electrically-conductive material such as a metal, and commonly are made of aluminum due to its electrical conductivity and relative cost. For example, current collectors 22, 24 may be thin sheets of aluminum foil.

Porous separator 18 electronically insulates the carbon-based electrodes 14, 16 from each other while allowing ion diffusion. The porous separator can be made of a dielectric material such as cellulosic materials, glass, and inorganic or organic polymers such as polypropylene, polyesters or polyolefins. In embodiments, a thickness of the separator layer can range from about 10 to 250 microns.

The electrolyte 20 serves as a promoter of ion conductivity, as a source of ions, and may serve as a binder for the carbon. The electrolyte typically comprises a salt dissolved in a suitable solvent. Suitable electrolyte salts include quaternary ammonium salts such as those disclosed in commonly-owned U.S. patent application Ser. No. 13/682,211, the disclosure of which is incorporated herein by reference. Example quaternary ammonium salts include tetraethylammonium tetraflouroborate ((Et)$_4$NBF$_4$) or triethylmethyl ammonium tetraflouroborate (Me(Et)$_3$NBF$_4$).

Example solvents for the electrolyte include but are not limited to nitriles such as acetonitrile, acrylonitrile and propionitrile; sulfoxides such as dimethyl, diethyl, ethyl methyl and benzylmethyl sulfoxide; amides such as dimethyl formamide and pyrrolidones such as N-methylpyrrolidone. In embodiments, the electrolyte includes a polar aprotic organic solvent such as a cyclic ester, chain carbonate, cyclic carbonate, chain ether and/or cyclic ether solvent. Example cyclic esters and chain carbonates have from 3 to 8 carbon atoms, and in the case of the cyclic esters include β-butyro-lactone, γ-butyrolactone, γ-valerolactone and δ-valerolactone. Examples of the chain carbonates include dimethyl carbonate, diethyl carbonate, dipropyl carbonate, ethylene carbonate, methyl ethyl carbonate, methyl propyl carbonate and ethyl propyl carbonate. Cyclic carbonates can have from 5 to 8 carbon atoms, and examples include 1,2-butylene carbonate, 2,3-butylene carbonate, 1,2-pentene carbonate, 2,3-pentene carbonate and propylene carbonate. Chain ethers can have 4 to 8 carbon atoms. Example chain ethers include dimethoxyethane, diethoxyethane, methoxyethoxyethane, dibutoxyethane, dimethoxypropane, diethoxypropane and methoxyethoxypropnane. Cyclic ethers can have from 3 to 8 carbon atoms. Example cyclic ethers include tetrahydofuran, 2-methyl-tetrahydrofuran, 1,3-dioxolan, 1,2-dioxolan, 2-methyldioxolan and 4-methyldioxolan. A combination of two or more solvents may also be used.

As examples, an assembled EDLC can comprise an organic liquid electrolyte such as tetraethylammonium tetrafluoroborate (TEA-TFB) or triethylmethylammonium tetrafluoroborate (TEMA-TFB) dissolved in an aprotic solvent such as acetonitrile.

Ultracapacitors may have a jelly roll design, prismatic design, honeycomb design, or other suitable configuration. A carbon-based electrode made according to the present disclosure can be incorporated into a carbon-carbon ultracapacitor or into a hybrid ultracapacitor. In a carbon-carbon ultracapacitor, both of the electrodes are carbon-based electrodes. In a hybrid ultracapacitor, one of the electrodes is carbon-based, and the other electrode can be a pseudo capacitive material such as lead oxide, ruthenium oxide, nickel hydroxide, or another material such as a conductive polymer (e.g., parafluorophenyl-thiophene).

In carbon-carbon ultracapacitors, the activated carbon in each electrode may have the same, similar or distinct properties. For example, the pore size distribution of the activated carbon incorporated into a positive electrode may be different than the pore size distribution of the activated carbon incorporated into a negative electrode.

Within an individual ultracapacitor cell, and under the influence of an applied electric potential, an ionic current flows due to the attraction of anions in the electrolyte to the positive electrode and cations to the negative electrode. Ionic charge can accumulate at each of the electrode surfaces to create charge layers at the solid-liquid interfaces. The accumulated charge is held at the respective interfaces by opposite charges in the solid electrode to generate an electrode potential.

During discharge of the cell, a potential across the electrodes causes ionic current to flow as anions are discharged from the surface of the positive electrode and cations are discharged from the surface of the negative electrode. Simultaneously, an electronic current can flow through an external circuit located between the current collectors. The external circuit can be used to power electrical devices.

The amount of charge stored in the layers impacts the achievable energy density and power density of the capacitor. The performance (energy and power density) of an ultracapacitor depends largely on the properties of the activated carbon that makes up the electrodes. The properties of the activated carbon, in turn, can be gauged by evaluating, for example, the porosity and pore size distribution of the activated carbon, as well as the impurity content within the activated carbon, such as nitrogen or oxygen. Relevant electrical properties include the potential window, area-specific resistance and the volumetric capacitance.

EXAMPLES

Various embodiments will be further clarified by the following examples.

The synthetic resin-based carbons disclosed in various examples herein were produced by initially crosslinking the resin in a curing process in air at about 150° C. before carbonization. The cured resin materials were carbonized in nitrogen at 800° C. and activated using a variety of described below. Following activation the activated carbon materials were washed in an acid wash (HCl) and a base wash (ammonia) followed by heat treatment in forming gas to reduce the oxygen content.

The potential window (or electrochemical window) is the voltage range over which the electrode material (e.g., carbon-based electrode material and/or liquid electrolyte) is neither reduced nor oxidized. Electrochemical double layer capacitors (EDLCs) that include the activated carbon materials as disclosed herein can have a potential window of at least 3V (e.g., at least 3, 3.2 or 3.5 V) and/or a volumetric capacitance of at least 35 F/cc (e.g., at least 35, 40, 45, 50, 55, 60, 65, 70, 75 or 80 F/cc). In related embodiments, the potential window and the volumetric capacitance can each be characterized over a range between any of the foregoing values.

Example 1

Figure 4:
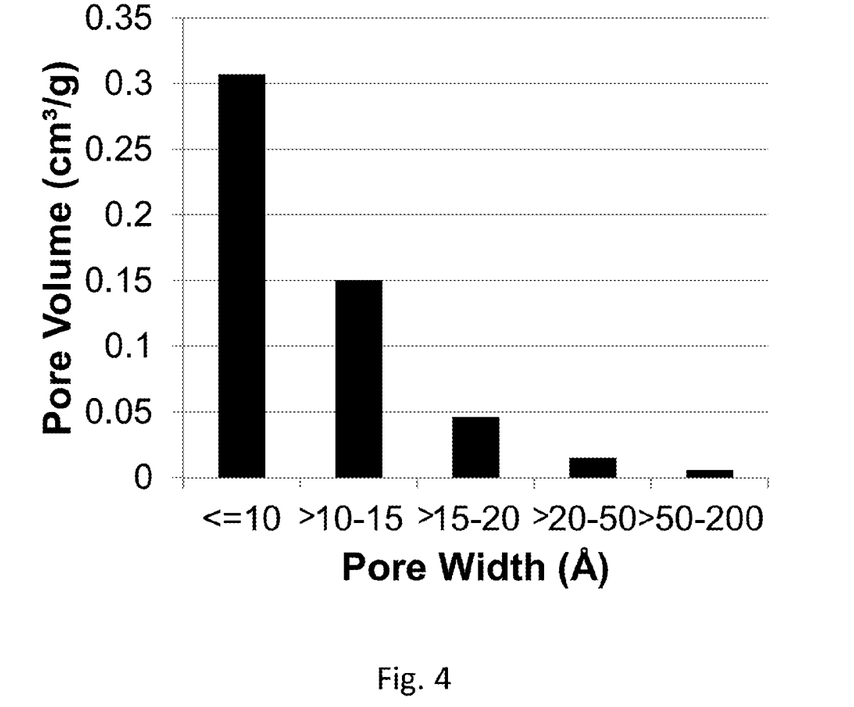
FIG. 4 is a pore size distribution histogram of an activated carbon material according to one embodiment.

Novolac resin (resin type A, Qingdaoheli Chemical Co., Shandong, China) was cured at 150° C., ground to an average particle size (D50) of about 5 microns, and then carbonized at 800° C. for 2 hours. The carbonized resin (10 g) was activated at 975° C. for 2.5 hours using a $CO_2$ flow rate of 12 L/m. In a button cell with a 1.5M TEA-TFB electrolyte (in acetonitrile), the activated carbon had a volumetric capacitance of 84 F/cc. This carbon was evaluated for potential window performance in the same electrolyte and had a potential window of 3.5V. The pore size distribution of the Example 1 activated carbon is shown in FIG. 4.

Example 2

The novolac resin as cured and carbonized in example 1 (10 g) was activated at 950° C. for 3 hours with a $CO_2$ flow rate of 12 L/m. The slightly lower activation temperature resulted in an activated carbon that had a volumetric capacitance of 39 F/cc.

Example 3

The novolac resin as cured and carbonized in example 1 (10 g) was activated at 975° C. for 3 hours with a $CO_2$ flow rate of 12 L/m. The slightly longer activation time resulted in an activated carbon that had a volumetric capacitance of 55 F/cc.

Example 4

Figure 5:
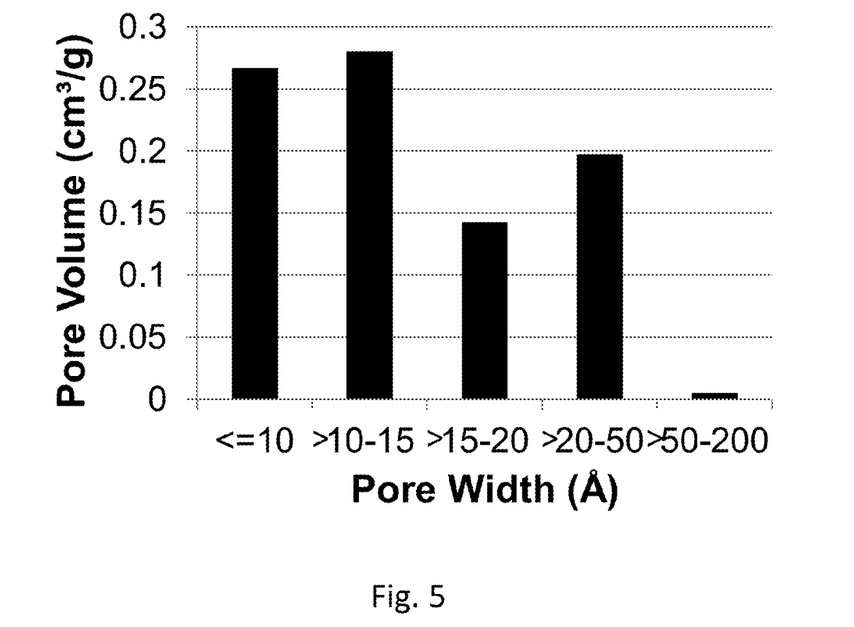
FIG. 5 is a pore size distribution histogram of an activated carbon material according to a further embodiment.

The novolac resin as cured and carbonized in example 1 (10 g) was activated at 975° C. for 4 hours with a $CO_2$ flow rate of 12 L/m. Increasing the activation time resulted in an activated carbon that had a volumetric capacitance of 74 F/cc. The pore size distribution of the Example 4 activated carbon is shown in FIG. 5.

Example 5

Novolac resin (resin type B, Plastics Engineering Company, Sheboygan, Wis.) was cured and carbonized as above, and then activated at 950° C. for 3 hrs with a $CO_2$ flow rate of 12 L/m. The activated carbon had a volumetric capacitance of 78 F/cc.

Example 6

The novolac resin of Example 5 was cured, carbonized and activated using the parameters of Example 1. In a button cell with 1.5M TEA-TFB electrolyte, the activated carbon had a volumetric capacitance of 55 F/cc.

Example 7

As-cured novolac resin (Type A, 1000 g) was carbonized as in example 1 and activated at 975° C. for 225 minutes with a $CO_2$ flow rate of 18 L/m. The volumetric capacitance was 78 F/cc. The resulting carbon was designated as Sample 7-1.

The Sample 7-1 carbon was washed and filtered in dilute HCl and DI water until the effluent was pH neutral. The washed carbon was heat treated in forming gas (1% $H_2/N_2$) at 900° C. The heat treated carbon was designated as 7-2.

The activated carbon samples were characterized for total oxygen content using laser-induced breakdown spectroscopy. Results are summarized in Table 3.

Referring to Table 3, the oxygen content of Sample 7-1 (without heat treatment) is lower than heat treated sample C-1 and D-1. Furthermore, Sample 7-1 is essentially free of carboxylic, carboxylic anhydride, lactone, and lactol surface functional groups.

Button cell capacitors were used to evaluate the electrical properties of the activated carbon.

Carbon-based electrodes were made by laminating activated carbon-containing sheets (approx. 1.5 cm×2 cm) onto an aluminum foil (1 mil thick) current collector. The activated carbon-containing sheets were made by mixing respective activated carbon powders and PTFE binder at a ratio of 95:5 by weight, and then rolling the resulting mixture into a continuous sheet. The typical sheet thickness was about 4 mil.

After drying the carbon-based electrodes overnight at 120° C. in a vacuum oven, test cells were assembled in a glove box filled with dry argon gas. Cells were made by sandwiching a piece of cellulose separator between two carbon-based electrodes. The assembled cells were placed in a plastic case. Limiting reduction potential and limiting oxidation potential measurements were performed after soaking each test cell in liquid electrolyte. The electrolyte included 1.5M tetraethylammonium tetrafluoroborate (TEA-TFB) in acetonitrile.

The electrochemical measurements were conducted using a Gamry Instruments potentiostat/galvostat with Framework 5 software. The limiting reduction potential and limiting oxidation potential were measured via cyclic voltammetry at a scan rate of 5 mV/s. In the measurements, a potential is applied between the reference electrode and the working electrode and the current is measured between the working electrode and the counter electrode. In the current versus voltage traces, the current will increase as the potential reaches the reduction potential of the electrode, but then falls off as the concentration of the electrolyte is depleted close to the electrode surface. The limiting reduction and oxidation potentials were determined by differentiating a plot of current versus voltage. Summarized below are the limiting potential measurements for the Example 1 carbon, which had the highest volumetric capacitance of the carbon materials produced.

Figure 6:
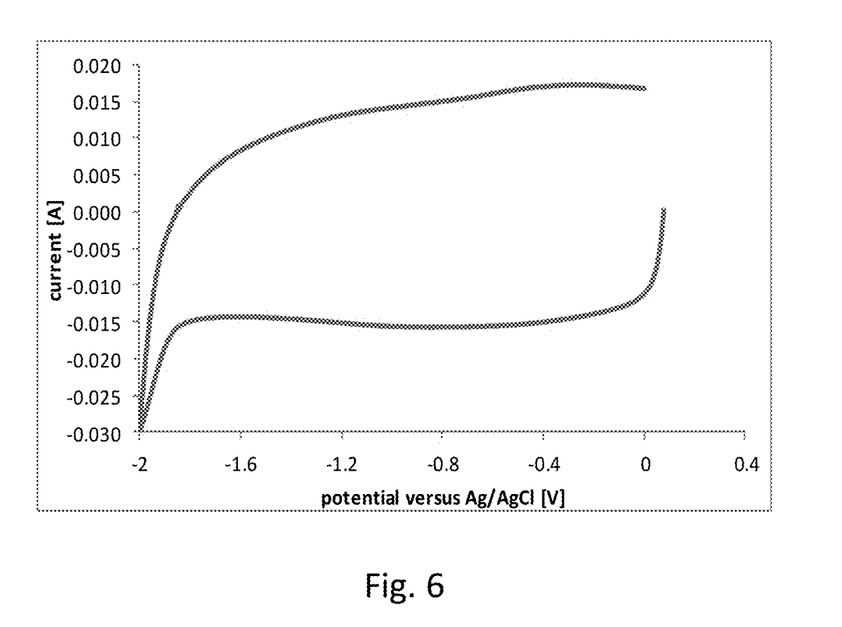
FIG. 6 is a plot of current versus voltage for a carbon-based electrode including activated carbon material according to one embodiment.
Figure 7:
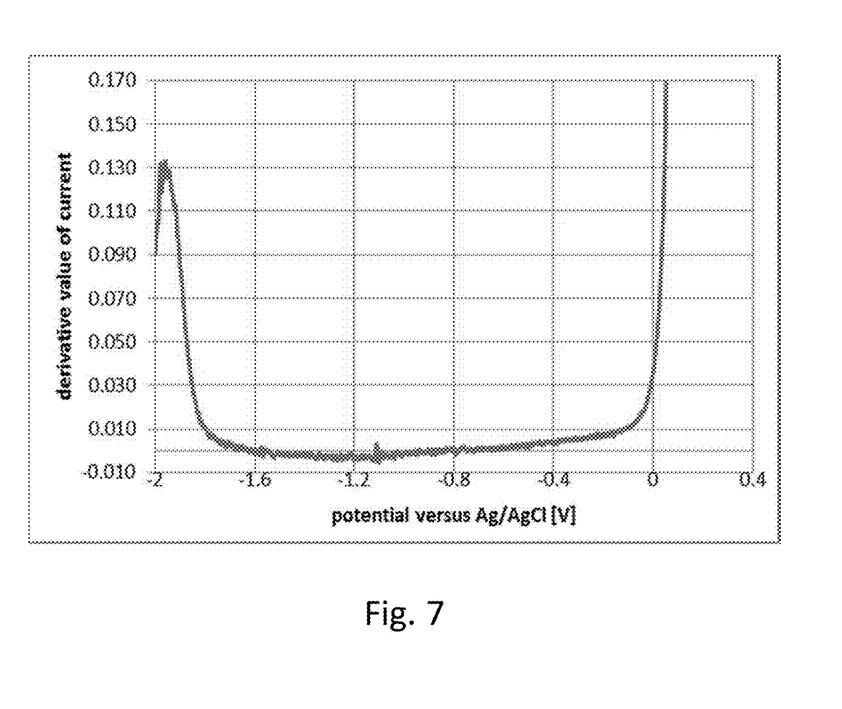
FIG. 7 is a differentiated plot corresponding to FIG. 6.

According to one embodiment, FIGS. 6 and 7 show cyclic voltammogram traces and a corresponding differentiated plot for an activated-carbon test cell comprising activated carbon made from novolac resin and activated using carbon dioxide (Example 1). The test simulates the performance of the carbon in the negative electrode. In the illustrated traces, the electrode exhibits a vertex of −2V. In the upper trace (reduction), it can be seen that the measured current maximum is about −15 mA, with a drop off at about −1.8V. This implies that there are reduction reactions that cause the current to decline at that voltage. Thus, the limiting reduction potential is about −1.8V versus Ag/AgCl.

Figure 8:
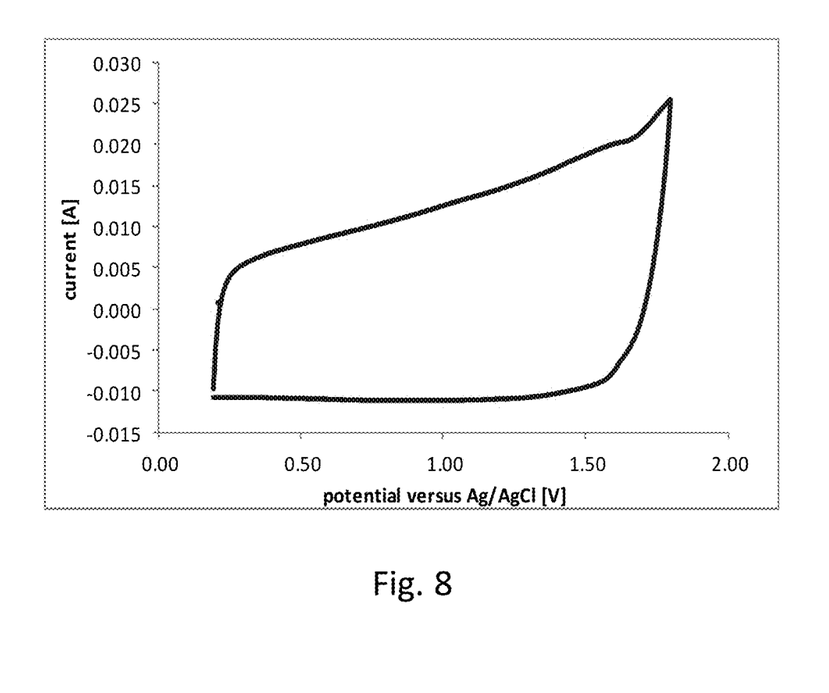
FIG. 8 is a plot of current versus voltage for a carbon-based electrode including activated carbon material according to a further embodiment.
Figure 9:
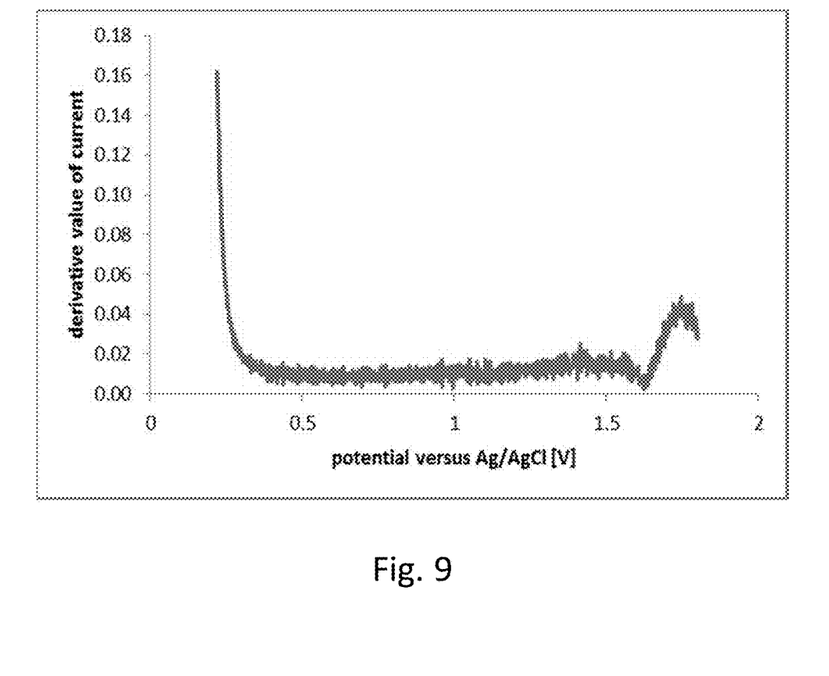
FIG. 9 is a differentiated plot corresponding to FIG. 8.

FIG. 8 shows cyclic voltammogram traces for another Example 1 electrode. This test simulates the performance of the carbon in the positive electrode. The data in FIG. 8 exhibit a vertex of about 1.8V. It can be seen that currents slightly increases with potential, and that a high rate of change in the current occurs at about 1.7V versus Ag/AgCl. Further, it can be seen in the differentiated plot of FIG. 9 that the limiting oxidation potential is about 1.7V versus Ag/AgCl.

A summary of potential window data for test cells comprising different activated carbon materials is shown in Table 2. The Example 1 carbon was derived from novolac phenol formaldehyde resin using $CO_2$ activation. Comparative Example A was derived from resole phenol formaldehyde resin using $CO_2$ activation. Comparative Example B was derived from wheat flour powder using $CO_2$ activation. Comparative Example C was derived from coconut shell powder using steam activation. Comparative Example D was derived from wheat flour powder using KOH chemical activation. Comparative Example E was derived from novolac phenol formaldehyde using KOH chemical activation.

As seen with reference to the data, the activated carbon of Example 1 exhibits lower reactivity with the electrolyte, which enables higher voltage stability. From the above cyclic voltammograms test data, the Example 1 carbon has a total potential window of 3.5V, which represents the sum of the absolute values for the limiting potentials from the respective negative and positive electrodes (1.8V+1.7V).

TABLE 2

Potential window data different activated carbon materials.

| Example | Precursor | Activation | Volumetric Capacitance [F/cc] | Potential Window [V] |
|---|---|---|---|---|
| 1 | novolac resin A | $CO_2$; 975° C.; 2.5 hr | 84 | 3.5 |
| 2 | novolac resin A | $CO_2$; 950° C.; 3 hr | 39 | 2.8 |
| 3 | novolac resin A | $CO_2$; 975° C.; 2.5 hr | 55 | |
| 4 | novolac resin A | $CO_2$; 975° C.; 4 hr | 74 | |
| 5 | novolac resin B | $CO_2$; 950° C.; 3 hr | 78 | |
| 6 | novolac resin B | $CO_2$; 975° C.; 2.5 hr | 55 | |
| 7 | novolac resin A | $CO_2$; 975° C.; 3.75 hr | 78 | |

TABLE 2-continued

Potential window data different activated carbon materials.

| Example | Precursor | Activation | Volumetric Capacitance [F/cc] | Potential Window [V] |
|---|---|---|---|---|
| A# | resole resin | carbon dioxide | 75 | 3.0 |
| B# | wheat flour | carbon dioxide | 68 | 2.9 |
| C# | ground coconut shell | steam | 65 | 2.9 |
| D# | wheat flour | KOH | 90 | 2.9 |
| E# | novolac resin | KOH | 90 | 3.0 |

Examples A-E are comparative

TABLE 3

Oxygen and surface functional group content of activated carbon

| Sample | T (heat treatment) | Oxygen [wt. %] | Carboxylic + Anhydride [mmol/g] | Lactone + Lactol [mmol/g] | Hydroxyl [mmol/g] |
|---|---|---|---|---|---|
| 7-1 | none | 0.60 | 0 | 0.02 | 0.18 |
| 7-2 | 900° C. | 0.27 | 0 | 0 | 0.15 |
| C-1# | n/a | 1.37 | 0 | 0.05 | 0.11 |
| C-2# | 900° C. | 0.18 | 0 | 0.03 | 0.06 |
| D-1# | 675° C. | 0.88 | 0.01 | 0.05 | 0.28 |
| D-2# | 900° C. | 0.24 | 0 | 0.01 | 0.19 |

Samples C-1, C-2, D-1 and D-2 are comparative

As used herein, the singular forms "a," "an" and "the" include plural referents unless the context clearly dictates otherwise. Thus, for example, reference to a "carbon precursor" includes examples having two or more such "carbon precursors" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a method that comprises the acts of carbonizing and activating include embodiments where the method consists of carbonizing and activating and embodiments where the method consists essentially of carbonizing and activating.

It will be apparent to those skilled in the art that various modifications and variations can be made to the present invention without departing from the spirit and scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

We claim:

1. A method of forming activated carbon, comprising:
carbonizing a carbon precursor by heating the carbon precursor at a carbonization temperature effective to form a carbon material; and
activating the carbon material by heating the carbon material at an activation temperature while exposing the carbon material to carbon dioxide,
wherein the carbon precursor comprises phenolic novolac resin, and
wherein the activated carbon comprises:
pores having a size of ≤1 nm, which provide a combined pore volume of ≥0.2 $cm^3/g$;
pores having a size of from >1 nm to ≤2 nm, which provide a combined pore volume ranging from 0.05 to 0.25 $cm^3/g$; and
<0.20 $cm^3/g$ combined pore volume of any pores having a size of >2 nm.

2. The method according to claim 1, wherein the activated carbon comprises
pores having a size of ≤1 nm, which provide a combined pore volume of ≥0.3 $cm^3/g$;
pores having a size of from >1 nm to ≤2 nm, which provide a combined pore volume ranging from 0.1 to 0.2 $cm^3/g$; and
<0.1 $cm^3/g$ combined pore volume of any pores having a size of >2 nm.

3. The method according to claim 1, wherein the carbon precursor consists essentially of phenolic novolac resin.

4. The method according to claim 1, further comprising curing the carbon precursor prior to carbonizing at a curing temperature ranging from 65-200° C.

5. The method according to claim 1, wherein the carbonization temperature is from 600-800° C.

6. The method according to claim 1, wherein the activation temperature is from 900-1100° C.

7. The method according to claim 1, wherein the carbon material has an average particle size of less than 200 microns prior to activation.

8. The method according to claim 1, wherein the carbon material has an average particle size of from 1 to 10 microns prior to activation.

9. The method according to claim 1, further comprising modifying the average particle size of the activated carbon to less than 20 microns.

10. The method according to claim 1, wherein the activated carbon comprises <0.05 $cm^3/g$ combined pore volume of any pores having a size of >2 nm.

11. The method according to claim 1, wherein the activated carbon comprises a total pore volume of ≥0.45 $cm^3/g$.

12. The method according to claim 1, wherein the activated carbon comprises a total pore volume of ≥0.70 $cm^3/g$.

13. The activated carbon produced according to the method of claim 1.

14. An electrochemical double layer capacitor (EDLC) having at least one electrode, wherein the at least one electrode comprises the activated carbon produced according to the method of claim 1.

15. The electrochemical double layer capacitor according to claim 13, wherein the EDLC has potential window of greater than 3V.

16. The method of claim 1, wherein curing comprises heating a mixture of hexamethylene tetraamine and the carbon precursor to the curing temperature.

17. The method of claim 1, wherein curing comprises heating the carbon precursor to and holding at a first temperature ranging from 25-50° C. and heating to the curing temperature.

18. Activated carbon derived from phenolic novolac resin, said activated carbon comprising:
pores having a size of ≤1 nm, which provide a combined pore volume of ≥0.2 $cm^3/g$;
pores having a size of from >1 nm to ≤2 nm, which provide a combined pore volume ranging from 0.05 to 0.25 $cm^3/g$; and
<0.2 $cm^3/g$ combined pore volume of any pores having a size of >2 nm.

19. Activated carbon comprising:
pores having a size of ≤1 nm, which provide a combined pore volume of ≥0.2 $cm^3/g$;
pores having a size of from >1 nm to ≤2 nm, which provide a combined pore volume ranging from 0.05 to 0.25 $cm^3/g$; and
<0.2 $cm^3/g$ combined pore volume of any pores having a size of >2 nm.

20. The activated carbon of claim 19, comprising <0.05 $cm^3/g$ combined pore volume of any pores having a size of >2 nm.

* * * * *